APPARATUS AND METHOD FOR PRODUCING DISK PHONOGRAPH RECORDS

Filed Feb. 24, 1949 12 Sheets-Sheet 1

INVENTOR
A. I. MASSLER
BY
Angelo M. Pisarra
ATTORNEY

Oct. 14, 1952 A. I. MASSLER 2,613,395

APPARATUS AND METHOD FOR PRODUCING DISK PHONOGRAPH RECORDS

Filed Feb. 24, 1949 12 Sheets-Sheet 2

INVENTOR
A. I. MASSLER
BY
Angelo M. Pisarra
ATTORNEY

Oct. 14, 1952 A. I. MASSLER 2,613,395

APPARATUS AND METHOD FOR PRODUCING DISK PHONOGRAPH RECORDS

Filed Feb. 24, 1949 12 Sheets-Sheet 3

INVENTOR
A. I. MASSLER
BY
Angelo M. Pisarra
ATTORNEY

Oct. 14, 1952 A. I. MASSLER 2,613,395

APPARATUS AND METHOD FOR PRODUCING DISK PHONOGRAPH RECORDS

Filed Feb. 24, 1949 12 Sheets-Sheet 4

INVENTOR
A. I. MASSLER
BY
Angelo M. Pizzarro
ATTORNEY

INVENTOR
A. I. MASSLER
BY
Angelo M. Pisarra
ATTORNEY

INVENTOR
A. I. MASSLER
BY
Angelo M. Pizarra
ATTORNEY

APPARATUS AND METHOD FOR PRODUCING DISK PHONOGRAPH RECORDS

Filed Feb. 24, 1949 12 Sheets-Sheet 7

INVENTOR
A. I. MASSLER
BY
Angelo M. Pisarra
ATTORNEY

APPARATUS AND METHOD FOR PRODUCING DISK PHONOGRAPH RECORDS

INVENTOR
A. I. MASSLER
BY
Angelo M. Pisarra
ATTORNEY

Oct. 14, 1952 A. I. MASSLER 2,613,395

APPARATUS AND METHOD FOR PRODUCING DISK PHONOGRAPH RECORDS

Filed Feb. 24, 1949 12 Sheets-Sheet 9

INVENTOR
A. I. MASSLER.
BY
Angelo M. Pisarra
ATTORNEY

APPARATUS AND METHOD FOR PRODUCING DISK PHONOGRAPH RECORDS

Filed Feb. 24, 1949 12 Sheets-Sheet 10

INVENTOR
A. I. MASSLER
BY
Angelo M. Pisarra
ATTORNEY

Oct. 14, 1952 | A. I. MASSLER | 2,613,395

APPARATUS AND METHOD FOR PRODUCING DISK PHONOGRAPH RECORDS

Filed Feb. 24, 1949 | 12 Sheets-Sheet 11

INVENTOR
A. I. MASSLER
BY
Angelo M. Pisarra
ATTORNEY

Oct. 14, 1952 A. I. MASSLER 2,613,395

APPARATUS AND METHOD FOR PRODUCING DISK PHONOGRAPH RECORDS

Filed Feb. 24, 1949 12 Sheets-Sheet 12

INVENTOR
A. I. MASSLER.
BY
Angelo M. Pisarra
ATTORNEY

Patented Oct. 14, 1952 2,613,395

UNITED STATES PATENT OFFICE 2,613,395

APPARATUS AND METHOD FOR PRODUCING DISK PHONOGRAPH RECORDS

Abraham I. Massler, Irvington, N. J., assignor to M & W Company, Inc., Newark, N. J., a corporation of New Jersey Application February 24, 1949, Serial No. 78,065

6 Claims. (Cl. 18—30)

This invention is directed to novel methods, steps in the methods, apparatus and sub-combinations thereof for the production of phonograph disc records.

The main purpose of this invention is to provide novel methods and apparatus for producing the disc records at relatively low cost. This is accomplished by the present invention, which permits commercial and efficient production because the records may be produced in large volume, at a high speed and automatically.

In addition, the novel apparatus is compact and of such unique design that it may be arranged in multiple side-by-side relationship to provide a gang of them which require the attendance of only a single operator. The apparatus in single or multiple relationship may be combined with a conveyor which receives and conveys the records from the apparatus and to deliver for labeling completely finished records ready for labeling.

The various advantages of the invention will be apparent from the following description taken in conjunction with the drawings, wherein:

Figs. 4 and 5 are views mainly in cross section longitudinally with some parts shown in side elevation, and taken together at lines A—A thereof, illustrating the operating mechanism of said embodiment of the invention.

Figure 1:
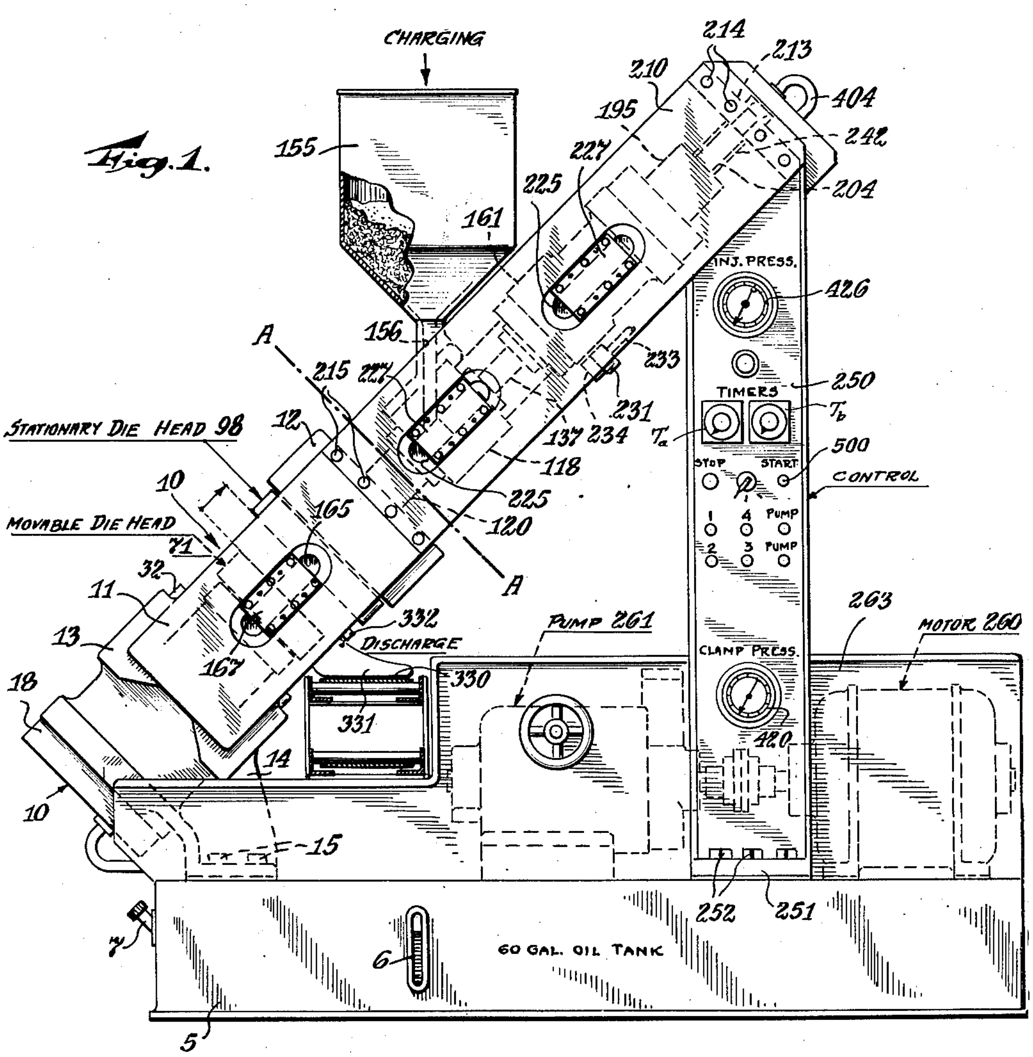
Fig. 1 is a view in side elevation of a machine embodying my invention and also shows a novel combination of said machine and a conveyor for receiving and conveying therefrom records as they discharge from said machine.
Figures 2, 3:
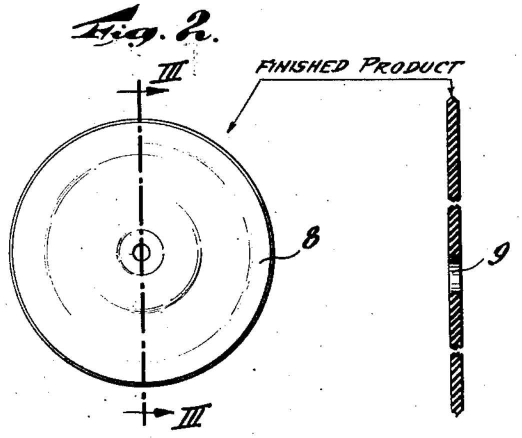
Fig. 2 is a top plan view of a disc phonograph record.
Fig. 3 is an enlarged and fragmentary cross-sectional view taken on line III—III of Fig. 2 in the direction of the arrows.
Figure 2:
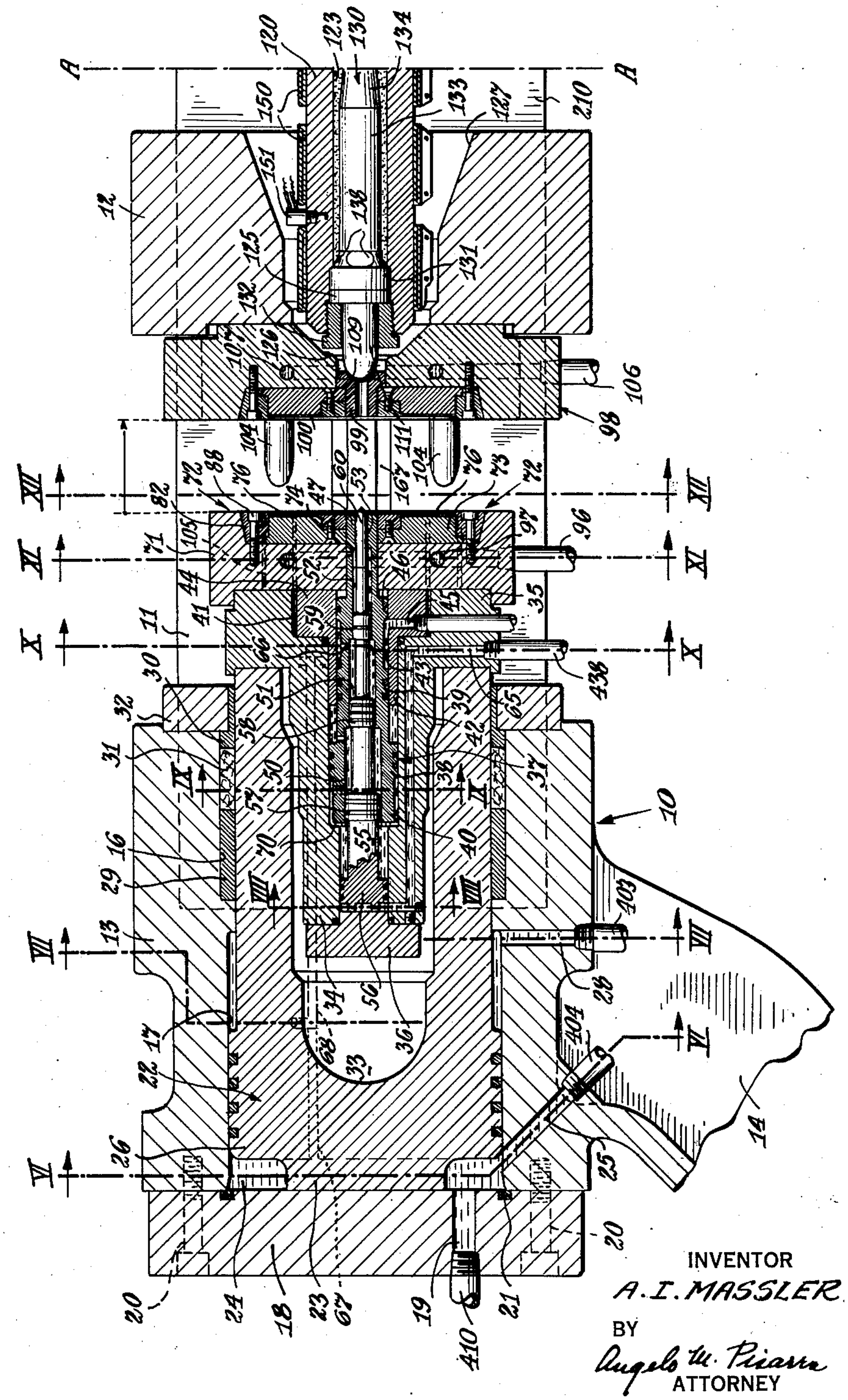

Secured to the floor or any other suitable support or base, is a horizontally disposed elongated fluid (oil or the like) tank 5 having a fluid-level sight 6 in one side thereof and a supply inlet 7 at one end thereof (Fig. 1). The tank 5 is oblong in top plan view and is of strong and rugged construction to support the various elements hereinafter described, whereby the entire assembly may occupy only a limited amount of space so that the assembly is compact, and therefore, a plurality of them may be so arranged within a prescribed area in such a manner that a single workman may take care of a gang of assemblies, and a single conveyor may be utilized for receiving disc records 8 having the usual opening 9 therethrough, as they are fed thereto from the various molding machines.

Supported by the tank 5 is a single, unitary casting 10 comprising a pair of supporting frame or tension members 11, an abutment platen 12 extending across the space between the tension members 11, a clamping cylinder 13 and a supporting and connecting bracket 14 extending from cylinder 13 and terminating in feet 15. The abutment platen 12 which is integral with the tension members 11 is so disposed as to be at right angles to said tension members 11 and has its center-line approximately parallel to the longitudinal center lines of the tension members 11 and coincidental with the longitudinal center-line of the cylinder 13. The casting 10 is mounted on the fluid tank 5, with the mounting feet 15 lying on the horizontally disposed top of the tank 5 at one end thereof and firmly connected thereto by bolts or any other convenient means.

The plane of the bottom face of the feet 15 is at an angle of 35°–55° and preferably 45° to the longitudinal axis of the cylinder 13, so that the casting 10, mounted as shown in Fig. 1, has its longitudinal center-line disposed at 35°–55° and preferably 45° to the horizontal, with each of the tension members 11 being in a vertical plane, and having its longitudinal axis at 35°–55° and preferably 45° to the horizontal, and with the abutment platen 12 disposed at an angle of 35°–55° and preferably 45° to the horizontal.

The clamping cylinder 13 has a pair of communicating and enlarged bores 16 and 17 (Fig. 4). A cylinder head 18 having a port 19 through the thickness thereof is secured to the lower end of the cylinder 13 by capscrews 20 and carries a conventional sealing ring 21 to aid in sealing the head 18 to the cylinder 13. Slideably mounted in the clamping cylinder 13 is a piston ram 22. The extreme lower end 23 of the ram 22 is of reduced diameter to provide an annular space 24 communicating with the port 19 and a port 25 through the side of the cylinder 13.

A portion of the ram 22 adjacent the end 23 is of increased diameter to provide a piston head 26 approximating the diameter of bore 17 of cylinder 13 and carries a plurality of conventional piston rings. The cylinder 13 has a port 28 extending through the side thereof and communicating with the space between the upper part of the bore 17 and the piston head 26. Bushings 29 and 30 with packing 31 located therebetween are disposed in the space between the upper part of the ram 22 and the bore 16 of the cylinder 13. The upper faces of the cylinder 13 and the bushing 30 are recessed to receive an annular retaining ring 32 which is anchored to cylinder 13 by capscrews not shown. The ram 22 has an elongated well 33 therein with the longitudinal axis of the well being coincident with that of the ram 22 and the cylinder 13. Located in said well and spaced from the sides thereof is a cylinder 34 whose upper end terminates in an outwardly extending annular flange 35 and is anchored to the piston ram 22 by means of cap screws (not shown) extending through flange 35 and into ram 22, so that the cylinder 34 is driven by and may be reciprocated in unison with the ram 22. The lower end of the cylinder 34 is closed by a cylinder head 36 carrying a conventional sealing ring. A unitary assembly 37 includes a plurality of in-line piston heads 38, 39 and 46 connected to each other. The piston head 39 is slideable in bore 40 of the cylinder 34 and carries conventional piston rings to prevent leakage. The outer end of the flange 35 has an annular recess 41 therein.

An inserted cylinder head 42 only partially depends into the bore 40 of the cylinder 34, has a bore 43 and has an annular flange 44 extending outwardly therefrom and located in the recess 41. A conventional sealing ring is carried by the cylinder 34 and is located between the cylinder 34 and the head 42 to prevent leakage. The piston head 39 is slideable in the bore 43 and carries conventional piston rings to prevent leakage. Extending through the flange 35 and the flange 44 are communicating openings which together provide a fluid passageway 45 communicating with the bore 43. The piston head 46 is also slideable in the bore 43 and carries a conventional piston ring to prevent leakage. Extending outwardly beyond the piston 46 and integral therewith is a cylindrical record pusher or stripper 47 whose axis of reciprocation is coincidental with that of the piston assembly 37 and the longitudinal axis of the cylinder 13. The triplex piston assembly together with the stripper 47 provide a single unitary hollow element 37 open at both ends and having bores 50, 51, 52 and 53 respectively, (Fig. 18) of gradually increasing diameters from the inner to the outer end thereof.

A compound piston assembly 55, consisting of in-line piston heads 56, 57, 58 and 59 are connected to each other, and each carries one or more conventional piston rings to prevent leakage. Integral with and extending outwardly from the piston 59 is a ram rod 60 which serves as a core and a record hole punch and sprue remover. Note Fig. 19 in which the rod 60 is shown in its core forming position and Fig. 20, where the rod 60 has advanced to push out part of the cast rod, the sprue portion, and moved it into the nozzle 111. The sprue is formed within the die cavity and is removed after the product, or record, is formed and re-melted in the heated zone of the nozzle 111.

Figure 18:
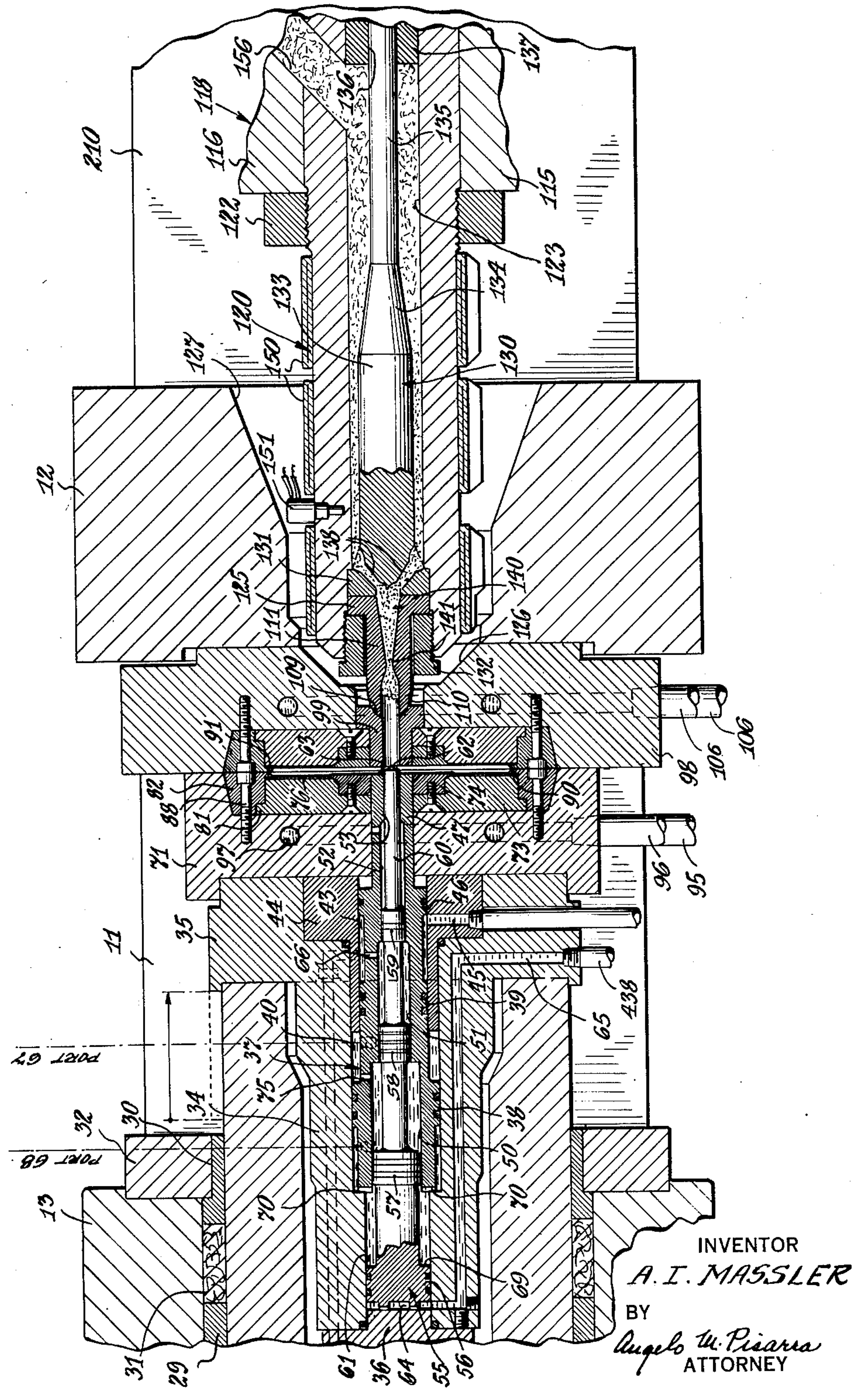
Fig. 18 is an enlarged longitudinal mainly cross-sectional view with some of the parts in side elevation of the central part ofthe mechanism shown in Figs. 4 and 5 as combined, but with the dies closed.

The piston head 56 is slideable in bore 61 of cylinder 34, pistons 57, 58 and 59 are respectively slideable in bores 50, 51 and 52, and rod 60 is slideable in bore 53 of stripper cylinder 47. The rod 60 is of a diameter corresponding to that of the opening 9 through the center of the common disc record 8 and its outer extremity is in the form of a shallow cone or teat 62, whose base has a diameter less than and usually about .5–.75 that the rod which together comprise the rod 60. The unitary element or ram rod comprising the assembly 55 and the sprue rod 60 are so proportioned that when it is in lowermost or completely retracted position as shown in Figs. 4 and 18, the upper end of the rod 60 at the base of the cone 62 is disposed outside of the outer face 63 of the stripper 47. The lower end of the piston 56 is recessed to provide a space 64 communicating with a fluid passageway 65 in the cylinder 34 and the flange 35 (Fig. 18). A transverse fluid port 66 extends through the piston assembly 37 at a place between the pistons 39 and 46. The port 66 communicates with the bore 51 and the bore 43 which in turn communicates with the fluid passageway 45. A transverse fluid port 75 extends through piston assembly 37 and communicates with bores 40 and 50. A fluid passageway 67 in the piston ram 22 and the cylinder 34 communicates with the space 24 and the upper end of bore 40 in turn communicates with the upper end of bore 50 through passage 75. A fluid passageway 68 in the piston ram 22 and the cylinder 34 communicates with bore 17 above the piston 26 and on that side of the piston head 26 opposite from that at the lower end of passageway 67, and with the bore 40 at the lower end thereof, the bore 40 in turn communicating with the upper end of bore 61 through passages 70.

The retracted stroke of the reciprocable ram rod is limited by the lower face of the ram rod abutting against a face of the cylinder head 36; and the advance stroke of the ram rod is limited by the outer face 69 of the piston head 56 abutting against the inner face of the multi-piston and stripper assembly 47, the inner end of which assembly extends beyond the face of the bore 61 and towards the center-line thereof, with said end having the grooves or passageways 70 therein communicating with the bores 40 and 61.

A die head 71 has a central bore therethrough, a recess in the bottom face thereof and a recess in the upper face thereof. The die head 71 is mounted, with the stripper 47 extending through the central bore of the die head 71 and the flanges 35 and 44 located in the lower recess thereof. The die head 71 is secured to the flange 35 by capscrews (not shown). Mounted in the recess in the upper face of the die head 71 is a die assembly or unit 72 comprising a demountable matrix support 73 having a central bore through which passes the stripper 47, having a shoulder ring 81 and an inner annular recess the contour of whose upper or outer portion tapers inwardly downwardly towards the supporting face of die head 71. A record matrix 76 lies flat-wise on the outer face of the matrix support 73. An inner retaining ring 74, having a center bore accommodating the stripper 47, is located in the inner recess in the matrix support 73.

The support 73 has a tapered or conical upper end contiguous with the tapered end of said retainer 74 extending outwardly beyond the matrix supporting face of the support 73 and slightly lapping over the bevelled inner periphery of the matrix 76 to serve as a temporary record retainer or holder. The retaining ring 74 is locked in position, with the outer inwardly inclined periphery thereof lapping over the inner bevelled periphery of matrix 76, by capscrews passing through the matrix support 73 and into the ring 74. The outer diameter of the matrix 76 is equal to the corresponding dimension of the matrix supporting face of support 73. An outer retaining ring 82 has a counter recessed portion matching the shoulder ring 81 and has an outer peripheral contour matching the tapered or conical bore surface of the inner recess in the die head 71. The retaining ring 82 has a narrow interior shoulder or flange 90, the thickness of which is equal to one half the thickness of the disc record 8 to be made. The innermost portion of the flange 90 is bevelled or otherwise tapered to provide a shallow taper conforming to half the thickness of the record to be made and extending around the outer periphery thereof. The inner shoulder 91 laps over the outer edge of the matrix 76, so that when the cap screws 88, passing through the retaining ring 82 and into the die head 71, are tightened, the retaining ring 82 comes home in the conical periphery of the recess in die head 71 and simultaneously clamps together the matrix 76 and the shoulder portion 91 of the ring 82. The shoulder portion 91 has a bevelled surface which forms a bevel on the periphery of the moulded product 335, or the record 8.

Figure 11:
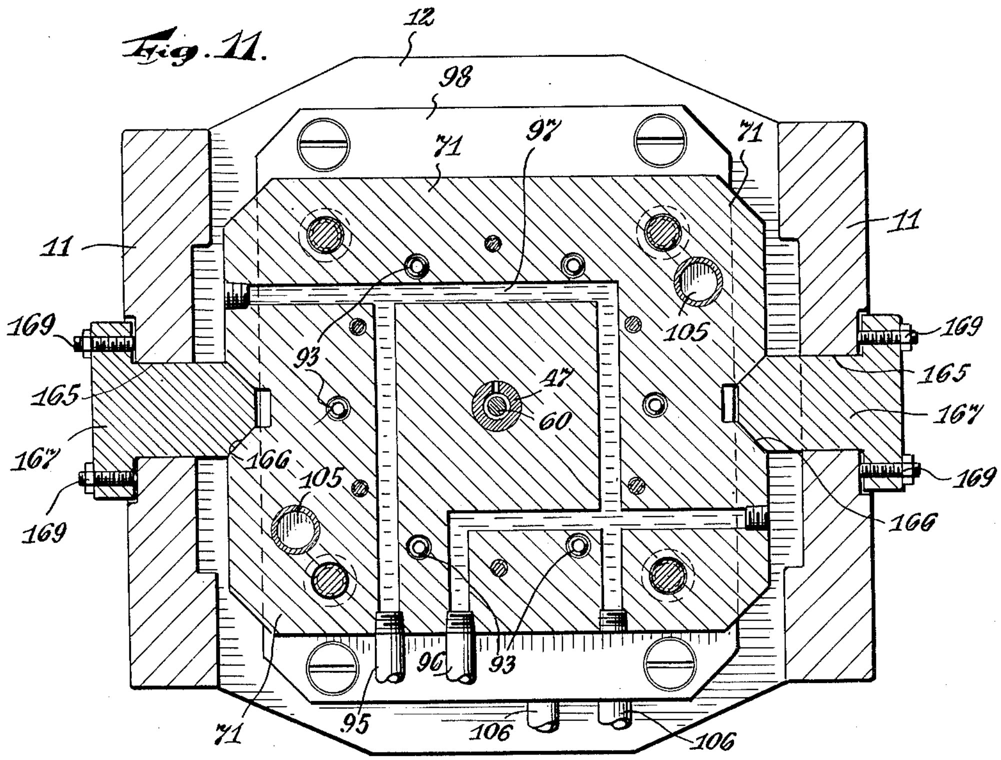
Fig. 11 is an enlarged cross-sectional view taken on line XI—XI of Fig. 4 in the direction of the arrows.
Figure 12:
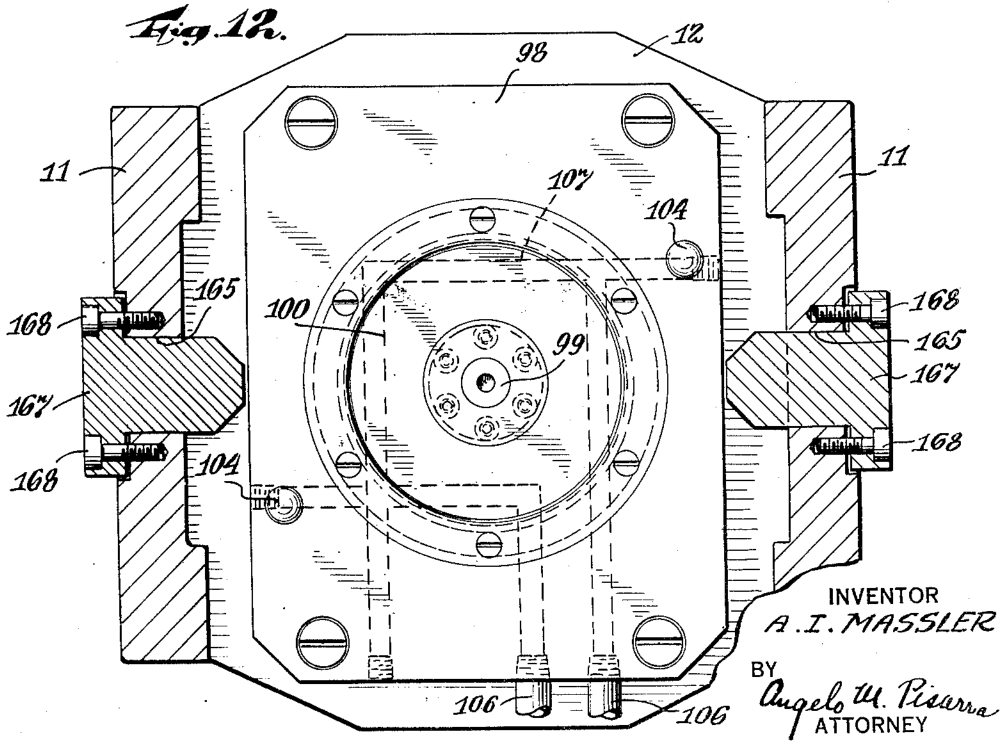
Fig. 12 is a fragmentary enlarged cross-sectional view taken on line XII—XII of Fig. 4 in the direction of the arrows.
Figures 21, 22, 23:
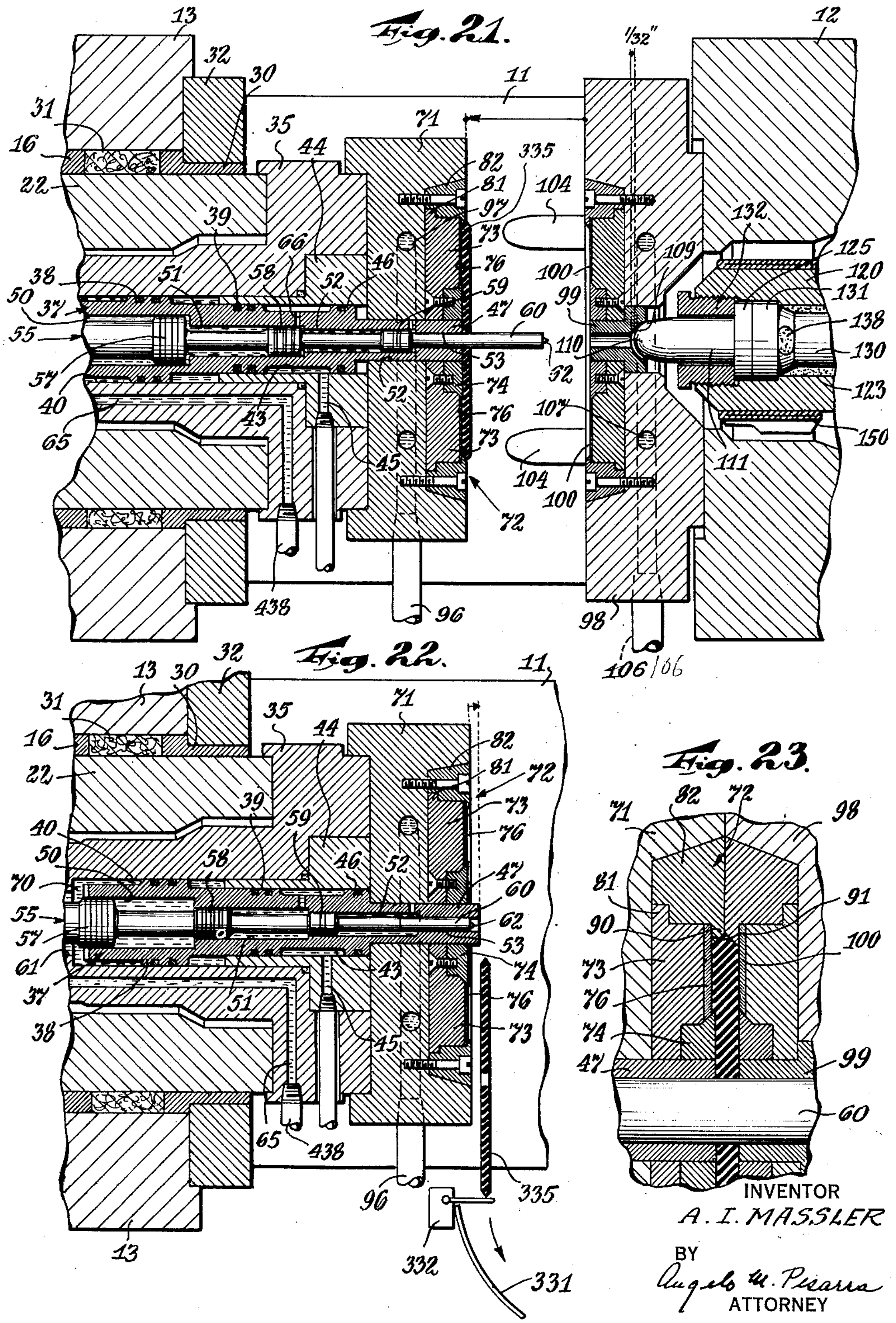
Fig. 21 is a view similar to Fig. 20, and shows the die heads in open position and before retraction of the sprue remover has been initiated.
Fig. 22 is a view similar to Fig. 20, except that the stationary die head and parts thereabove have been omitted and shows the record about to actuate a micro-switch in the course of its dropping into a chute after the stripper has pushed it out of the movable die head.
Fig. 23 is an enlarged fragmentary view in cross section and shows the relationship of the matrix and record retainer on the movable die head when the mold is closed as shown in Fig. 18.

The die head 71 has a plurality of shallow cylindrical cavities spaced therearound and located therein. Located in each of the cavities is a displacing spring 93, (Fig. 11) which is normally compressed by the die assembly 72 and serves to aid in breaking loose the outer retaining ring 82 when the screwcaps 88 are loosened in the course of disassembling the assembly 72 for changing matrix 76. The die head 71 has an inlet port 95 and an outlet port 96 communicating with a water circulating passageway 97 for the passage of cooling water therethrough for reducing the magnitude of the curing period. A stationary die head 98 (Fig. 18) is secured by cap screws (not shown) to face of the abutment platen 12 having a central opening through the thickness thereof. The head 98 is part of a die assemblage, or unit, substantially the same as unit 72. A pair of aligning male dowels 104 (Fig. 4) extend from die head 98 for mating with dowel bushings 105 (Fig. 11) carried by the die head 71 for assuring true alignment of the dies. The die head 98 has inlet and outlet ports 106 at the ends of passageway 107 therein for the passage of cooling water therethrough. The die head 98 has a central opening accommodating a sprue bushing 99 (Fig. 18) identical in transverse cross section with the stripper 47 and having a concave spherical nozzle accommodating recess or seat 109. A matrix 100 is coupled with the die head 98 in precisely the same manner as the matrix 76 is coupled with the movable die head 71, except that the bevelled edge of the inner retaining ring 74 on the head 71 is slightly further beyond the inner edge of matrix 76 so that it enters deeper into the record 8 for the purpose of causing the record to adhere to it after the dies are parted and to be retained thereto. The mold cavity is formed in each die unit by bore forming elements 47, 99; ring 74; matrix 76, 100 and ring 82, note Fig. 23 of the drawing.

Figure 13:
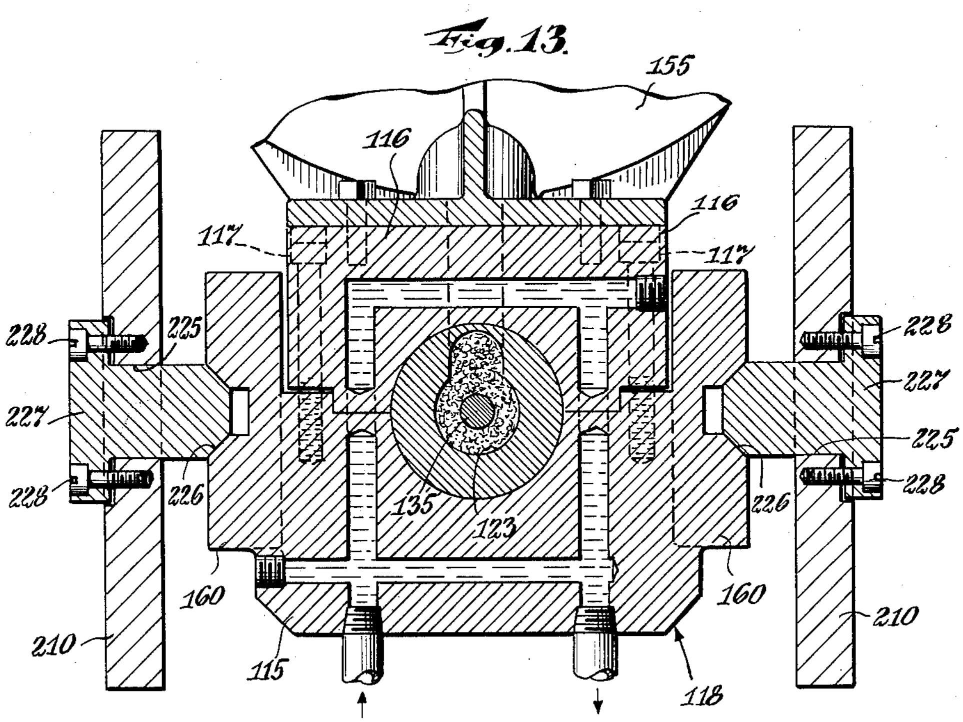
Figure 13 is a fragmentary enlarged cross-sectional view taken on line XIII—XIII of Fig. 5 in the direction of the arrows.

The spherical seat 109 is complementary to and mates with the spherical surface 110 at the discharge end of a nozzle 111 of an injection cylinder or chamber 120. Located between the tension members 11 is a saddle bracket 115 and a clamp cap 116, connected to each other by means of capscrews 117 (Fig. 13). The injection cylinder 120, having an outwardly extending shoulder or flange 121 at the upper end thereof, is supported by the bracket 115 and clamped thereto by the thrust cap 116, to firmly anchor the cylinder 120 against lateral motion.

The flange 121 (Fig. 5) bears against one end of the clamp comprising bracket 115-cap 116 and is tightened thereagainst by means of a thrust nut 122 engaging a threaded portion of the cylinder 120 to fix cylinder 120 against longitudinal movement relative to bracket 115. The clamp has inlet and outlet openings communicating with passageways for the circulation of cooling water therethrough for the purpose of maintaining the fusible granular material at the upper end of cylinder 120 from gumming up and impeding feeding. The injection cylinder 120 is elongated and has an elongated opening 123 or bore extending therethrough and is so disposed that its longitudinal center line is coincident with the longitudinal center line of bore through bushing 99 and that of the cylinder 13. The lower or inner end of the cylinder 120 has a threaded portion on the inner face thereof and also has a recess or counter bore on the inner face of a portion thereof adjacent the threaded portion to provide an abutting shoulder (Fig. 18).

A spreader 130 is located in the lower end of cylinder 120 and terminates in a head 131 neat fitting in the counter bore at the lower end of cylinder 120 and bearing against the abutting shoulder. The nozzle 111 has an outwardly extending flange 125 contiguous with head 131. The nozzle 111 extends through a thrust nut 132 in threaded engagement with the lower threaded end of cylinder 120 and when tightened against the flange 125, forces it against head 131 to form a seal between the abutting shoulder in cylinder 120 and head 131. The nozzle 111, nut 132 and the lower end of the cylinder 120 pass through a central opening 127, through the abutment platen 12 and into an opening 126 in die head 98 and communicating with the bore of bushing 99.

The spreader 130 has a barrel 133 tapered as seen at 134 wherein it joins a rod 135 which extends into and makes a neat sliding fit in the bore 136 of an injection plunger 137. The head 131 has a multiplicity of holes 138 with streamlined pockets for leading material into the holes and together with compartment 139 form passageways for material to flow into the nozzle 111 through its opening 140 communicating with and tapered reductively downwardly to an orifice 141 and then tapered increasingly downwardly to the discharge terminus thereof, which terminus is a cylinder of the same diameter as the opening through sprue bushing 99 and in alignment therewith.

The cylinder 120 may have a plurality of electric heating bands 150 clamped therearound. These heating elements may be of the necessary wattage to properly soften plasticize, or reduce the viscosity of the material to be injected at the rate desired. The energization and deenergization of these units may be remotely controlled by any suitable instrument to control the temperature of said material as desired, and generally through a thermostat 151 located at the lower end of the cylinder 120 and near the nozzle 111.

Figure 5:
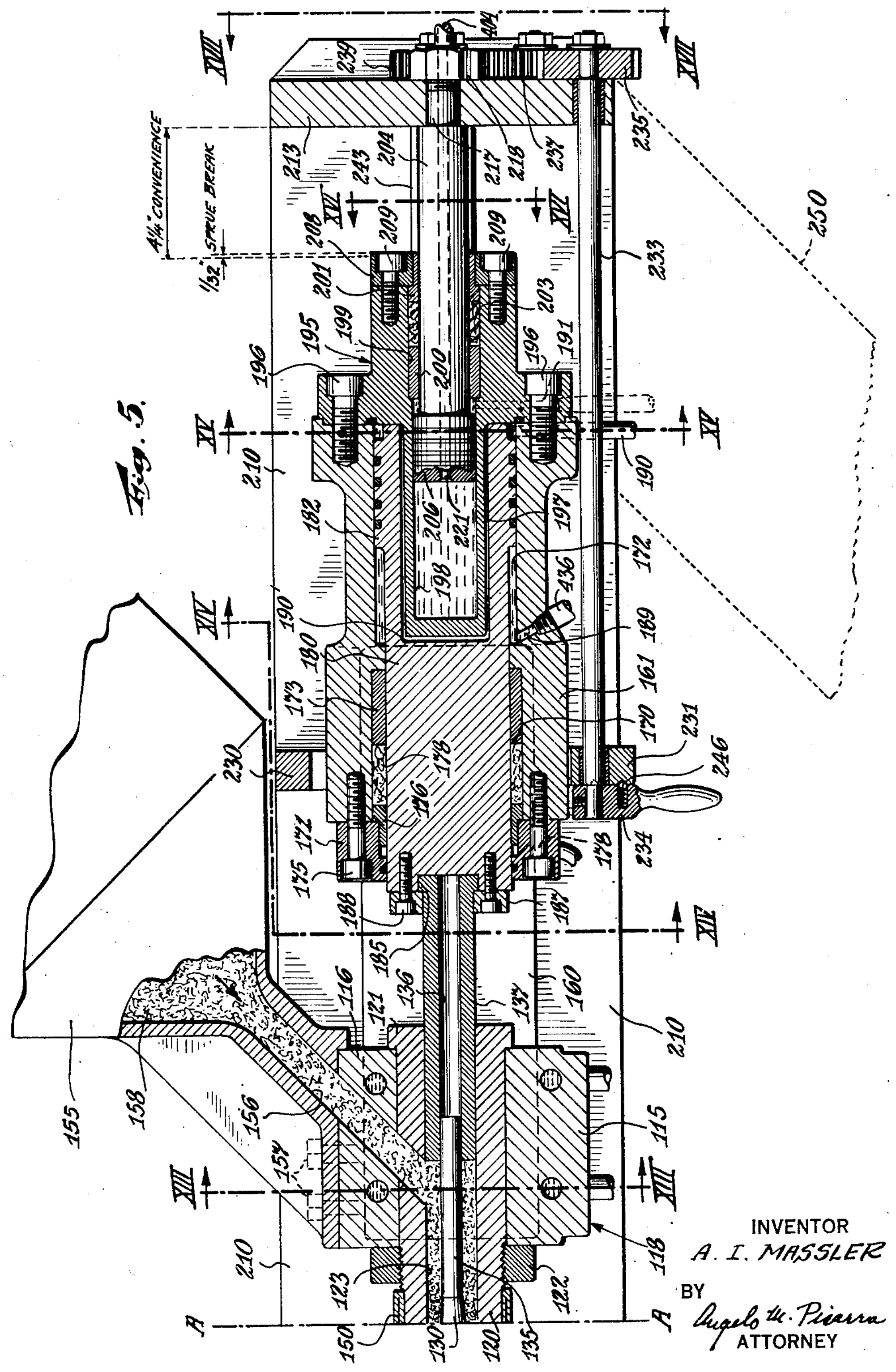
Figure 6:
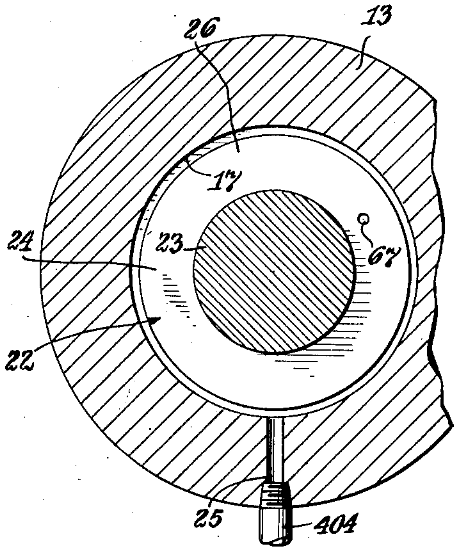
Fig. 6 is a fragmentary enlarged cross-sectional view taken on line VI—VI of Fig. 4 in the direction of the arrows.
Figure 7:
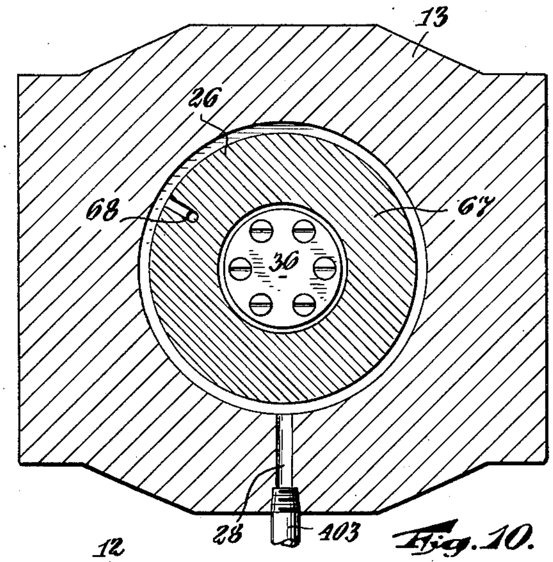
Fig. 7 is an enlarged cross-sectional view taken on line VII—VII of Fig. 4 in the direction of the arrows.
Figures 8, 9, 10:
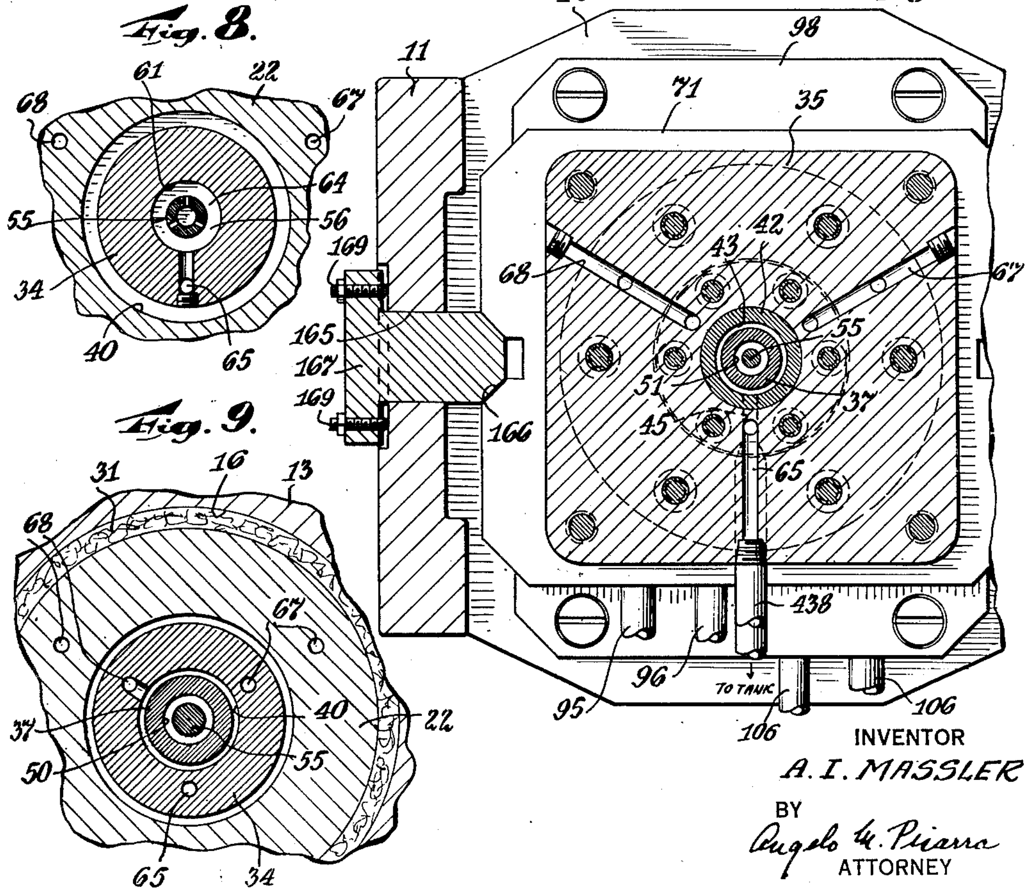
Fig. 8 is a fragmentary enlarged cross-sectional view taken on line VIII—VIII of Fig. 4 in the direction of the arrows.
Fig. 9 is a fragmentary enlarged cross-sectional view taken on line IX—IX of Fig. 4 in the direction of the arrows.
Fig. 10 is a fragmentary enlarged cross-sectional view taken on line X—X of Fig. 4 in the direction of the arrows.

A hopper 155 contains a supply of granular or comminuted material 158, which is essentially fusible and thermoplastic, such as the vinyl or other resins and employed for the molding of disc phonograph records (Fig. 5). The hopper 155 has a discharge outlet rigidly secured to the clamp 116 by bolts 157. The clamp cap 116 together with bracket 115 as well as the cylinder 120 have aligned openings also aligned with hopper outlet to provide a pasageway 156 from the hopper 155 to the bore of heating cylinder 120. The passageway 156 is disposed substantially vertically so that the plastic material may automatically, and acted upon solely by the force due to gravity, feed directly into the bore of cylinder 120 through passageway 156. Each of the tension members 11 has an elongated slot 165 (Fig. 1) along the longitudinal center line thereof. The slots 165 are so arranged that the slot in one member 11 is opposite the corresponding slot in the other member.

Each side face of the die head 71 (Fig. 11) has an elongated tapered guide groove 166 along its longitudinal center line. Adjustable bearing shoes 167 have bearing faces complementary to the tapered faces of the bearing grooves 166 and disposed therein. These shoes 167 pass through the slots 165 and terminate in outwardly extending flanges through which extend a plurality of capscrews 168, and also a plurality of set screws 169. These various screws 168 and 169 may be adjusted for aligning the die-head and also provide the desired sliding bearing between the shoes 167 and guide grooves 166.

Located in the space between a pair of side plates 210 (Fig. 13) are a pair of tension members 160 disposed substantially parallel to said plates. Each member 160 has one end thereof integral with the supporting bracket 115 and its other end integral with a cylinder 161 whose center line coincides with the center line of cylinder 13. The two members 160, saddle bracket 115 and cylinder 161 may together be a unitary, single casting. The cylinder 161 has bores 170 and 172 therein (Fig. 5). A gland flange 171 is secured to the lower end of the cylinder 161 by capscrews 175, and carries on its bearing face a conventional sealing ring to prevent leakage.

A cylinder bushing 173 makes a tight fit in the lower bore 170. Within the gland flange 171 is a gland bushing 176, and between the gland bushing 176 and the cylinder bushing 173 is a set of cheveron packing 178. The gland flange 171 has a transverse port 178 communicating with the internal bore thereof to act as an oil leakage outlet; and this together with the sealing ring in the gland flange 171 prevent any oil which may leak past the bushing 176 from reaching the injection plunger 137, which is kept dry at all times. A piston ram 180 is located in the cylinder 161 and includes a piston head 182 having a plurality of conventional piston rings for preventing leakage. The piston head 182 is centered by and makes a free sliding fit in bore 172. The remainder of the ram 180 is also centered by and makes a free sliding fit in the bores of the cylinder bushing 173, gland bushing 176 and the gland flange 171. The lower end of the ram 180 has a counter bore recess therein, in which is located a plunger head 185, in the nature of a flange and integral with the cylindrical plunger 137 at one end thereof. A plunger retaining ring 187 bearing against the shoulder of the head 185 is secured to the ram 180 by capscrews 188. The ring 187 maintains the head 185 of the injection plunger nestled in the recess at the end of ram 180, so that it is free floating diametrically but is closely confined laterally with very little, if any, thrust freedom.

The cylinder 161 has a transverse port 189 therein communicating with the bore 172 at the lower end thereof; the cylinder 161 also has another transverse port 190 therein and communicating with the bore 172 at the upper end thereof. The upper end of the ram 180 has a centrally disposed well 190′ therein. A cylinder head 195 is centered with and attached to the cyldiner 161 by capscrews 196. This cylinder head 195 carries a conventional sealing ring to prevent leakage between the cylinder 161 and the head 195. The cylinder head 195 has an elongated compartment 197, the closed end of which extends downwarly into the well 190′. The compartment has a lower bore 198 and an upper bore 199. The bore 199 is fitted with a cylinder bushing 200, a gland bushing 201 and with a cheveron packing 203 located therebetween. The cylinder or compartment 197 has a piston rod 204 extending through the open end thereof and making a bearing fit with the bushings 200, 201 and packing 203. The lower end of the piston rod 204 carries a piston head 206 carrying a plurality of conventional piston rings and located in bore 198, which is of greater diameter than the bore of the bushing 200. A gland flange 208 is secured to the outer end of the compartment of cylinder 197 with capscrews 209. In this manner the cylinder head 195 is secured in fixed relationship with respect to the cylinder 161 and may be employed to impart motion to the cylinder 161, and the injection cylinder 120. The head 195 has a transverse opening 191 terminating just below the bushing 200 to communicate with the bore 198 thereat.

Figure 14:
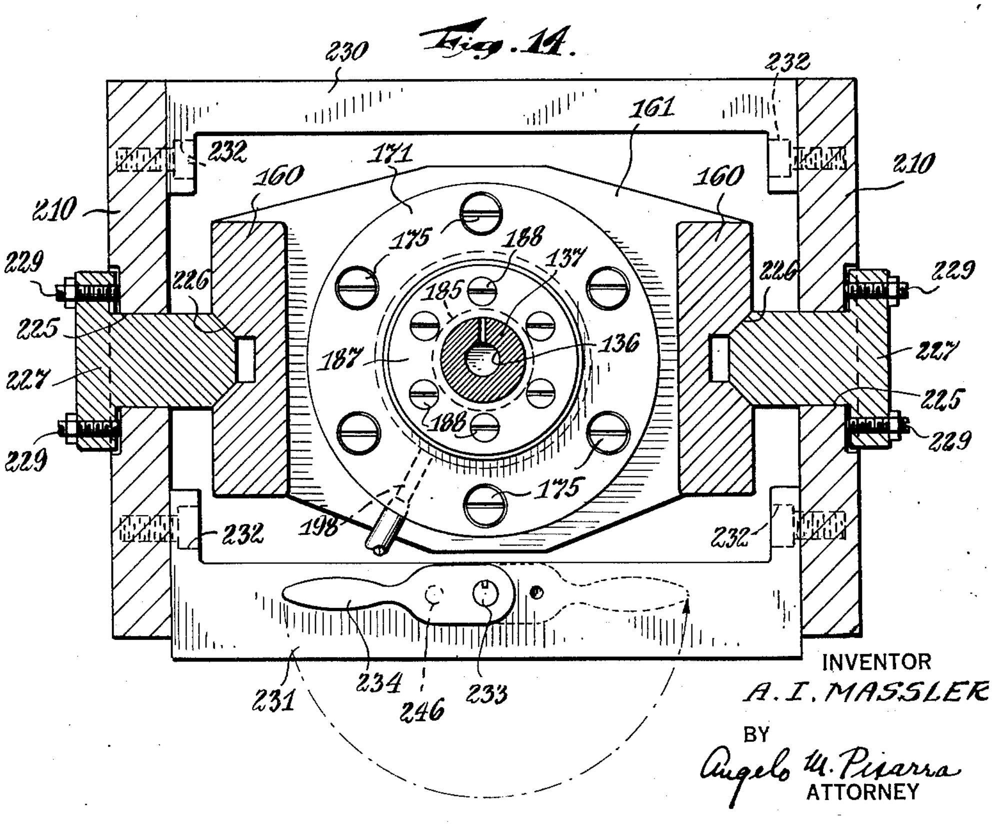
Fig. 14 is an enlarged cross-sectional view taken on line XIV—XIV of Fig. 5 in the direction of the arrows.
Figure 15:
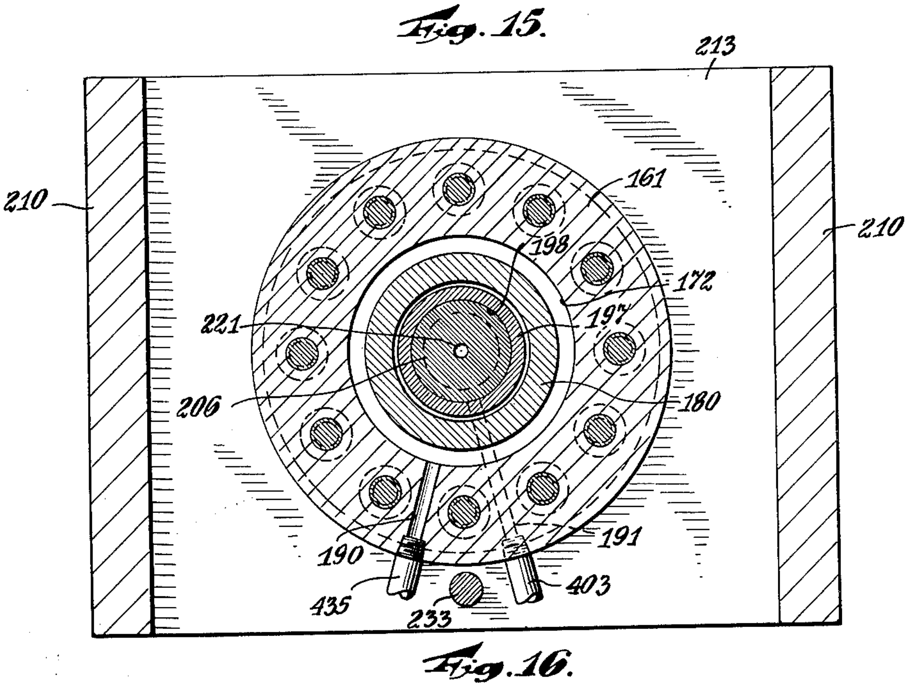
Fig. 15 is an enlarged cross-sectional view taken on line XV—XV of Fig. 5 in the direction of the arrows.

A frame (Fig. 1) comprises a pair of side plates 210 having recesses in the inner sides of the upper ends thereof, and an abutment cross member 213 whose ends are located in said recesses and is secured to said side plates by capscrews 214. These side plates 210 are spaced from each other, are disposed substantially as a continuation of the tension member 11, and each has its longitudinal center line coincidental with that of the corresponding tension member 11. The lower ends of said side plates 210 are accurately located and secured to the abutment platen 12 by capscrews 215 and dowels (not shown). The abutment cross member 213 has a central opening therethrough, through which extends a reduced threaded end 217 (Fig. 5) of the piston rod 204 and is coupled therewith in abutting relationship by a nut 218 on the threaded end 217. An elongated port 221 extends through the piston rod 204 and piston head 206 and communicates with the bore 198. The side plates 210 (Fig. 1) have a plurality of elongated slots 225 similar to the slots 165 and in longitudinal alignment with said slots, with each slot 225 in one side being directly opposite a corresponding slot in the other side 210. The tension members 160 (Figs. 13 and 14) have longitudinally extending bearing grooves therein in alignment with and similar to the bearing grooves 166 of head 71. A bearing shoe 227 which extends through each of the slots 225, has the bearing end thereof against the bearing faces of the groove 226 and has a plurality of screws 228 and 299 similar to the screws 168 and 169, and serving the same purpose as said screws 168 and 169.

A plurality of braces 230 and 231 (Fig. 14) extend across the space between the side plates 210 and are secured thereto by capscrews 232, and act as brace separators. The brace 231 (Fig. 5) has a bushing therethrough accommodating a shaft 233 extending therethrough and having one end thereof keyed to a handle or release lever 234. The other end of the shaft has a spur gear 235 (Figs. 16 and 17) keyed thereto. A pair of idler spur gears 236 and 237 mesh with the spur gear 235 and are mounted on top of the plate 213 (Fig. 17). Also mounted on the top of the plate 213 are spur gears 238 and 239 respectively meshing with the idlers 236 and 237. The spur gears 238 and 239 are respectively keyed to the shafts 240 and 241. Keyed to said shafts 240 and 241 (Fig. 16) and disposed below the plate 213 are a pair of eccentric cams 242 and 243, which in certain normal operating positions act as spacers between the abutment plate 213 and the flange 208 for limiting the stroke of the injection unit to a small increment of approximately one thirty-second of an inch when fluid pressure is applied through the port 191 and port 221 is connected with exhaust. The release lever 234 may be moved to rotate the shaft over an arc of 180° (Fig. 17) and acts through the train of gears to rotate the cams 242 and 243 to either operative or inoperative position. The lever carries a spring actuated ball detent 246 so when the lever is in one extreme position the ball 246 drops in a hole in brace 231 for latching as shown in Fig. 5.

Figure 16:
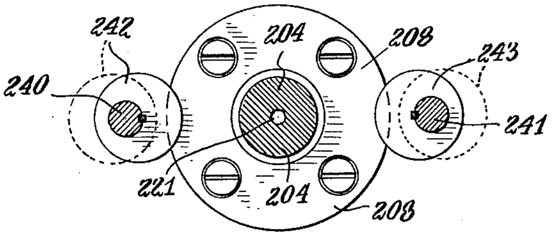
Fig. 16 is a cross-sectional view taken on line XVI—XVI of Fig. 5 in the direction of the arrows.
Figure 17:
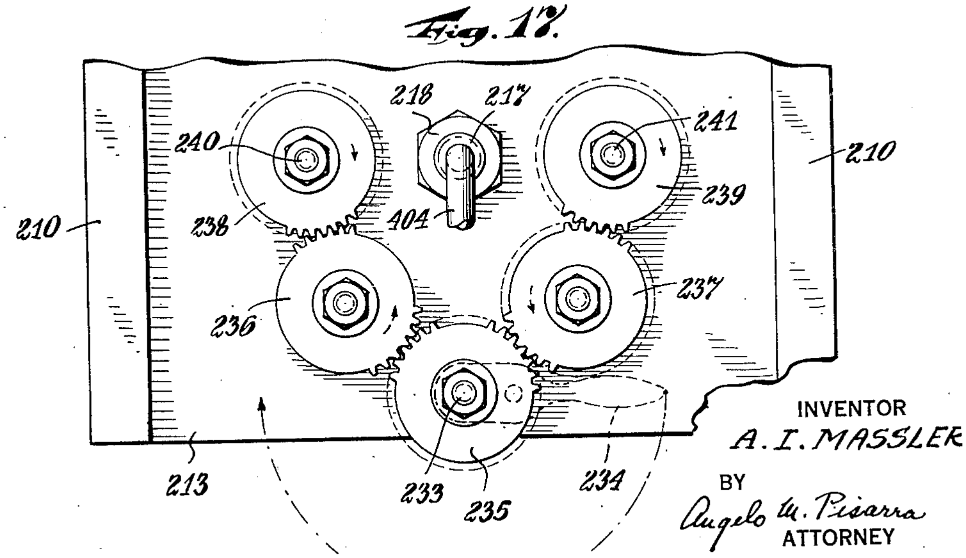
Fig. 17 is a fragmentary enlarged top plan view taken on line XVII—XVII of Fig. 5 in the direction of the arrows.

When the release lever 234 is placed in the other extreme position the effective parts of the cams 242 and 243 are turned outwardly and are disposed in the dotted line or inoperative position shown in Fig. 16. When so disposed the cams permit the gland flange 208 to pass between them allowing the longer stroke to occur whenever pressure is admitted to passageway 191 and passageway 221 is connected to exhaust.

A vertically disposed supporting column or housing 250 has feet 251 resting upon the top of the tank 5 near the side thereof away from the cylinder 13. The column 250 is rigidly secured to the tank through said feet 251 by bolts 252. The upper end of the column 250 is secured in any convenient manner to the upper end of the side plates 210 as well as to the end plate 213. The column 250 houses the various controls and dials at desirable operating levels. It also houses the valves, piping, timers, etc., while bridging a coupling which connects an electric motor 260 to a pump 261, both of which are secured to and supported by the top of the tank 5 and are disposed on either side of the column 250. The power unit consists of an electrically driven rotary piston variable displacement pump with built in gear pump for larger volume (low pressure) and an internal gear pump for pilot operation of variable displacement pump and operation of hydraulic directional valves. The pilot operated valves are electrically controlled to attain automatic operation through action of buttons, limit switch and electric timers.

Ventilated removable guards 263 are provided to completely house the power unit, which in itself is conventional. An endless belt conveyor 330 extends transversely of the machine and has a receiving stretch thereof located in the space just directly below the movable die head 71 when in open position to receive a disc 8 record as it is stripped from the matrix 76 by the stripper 47 and then acted upon solely by the force due to gravity, moves downwardly to trip the micro-switch and thence to chute 331. The chute 331 serves to guide the record and turn it to flatwise position, in which position it is deposited on the conveyor belt 330.

Figure 24:
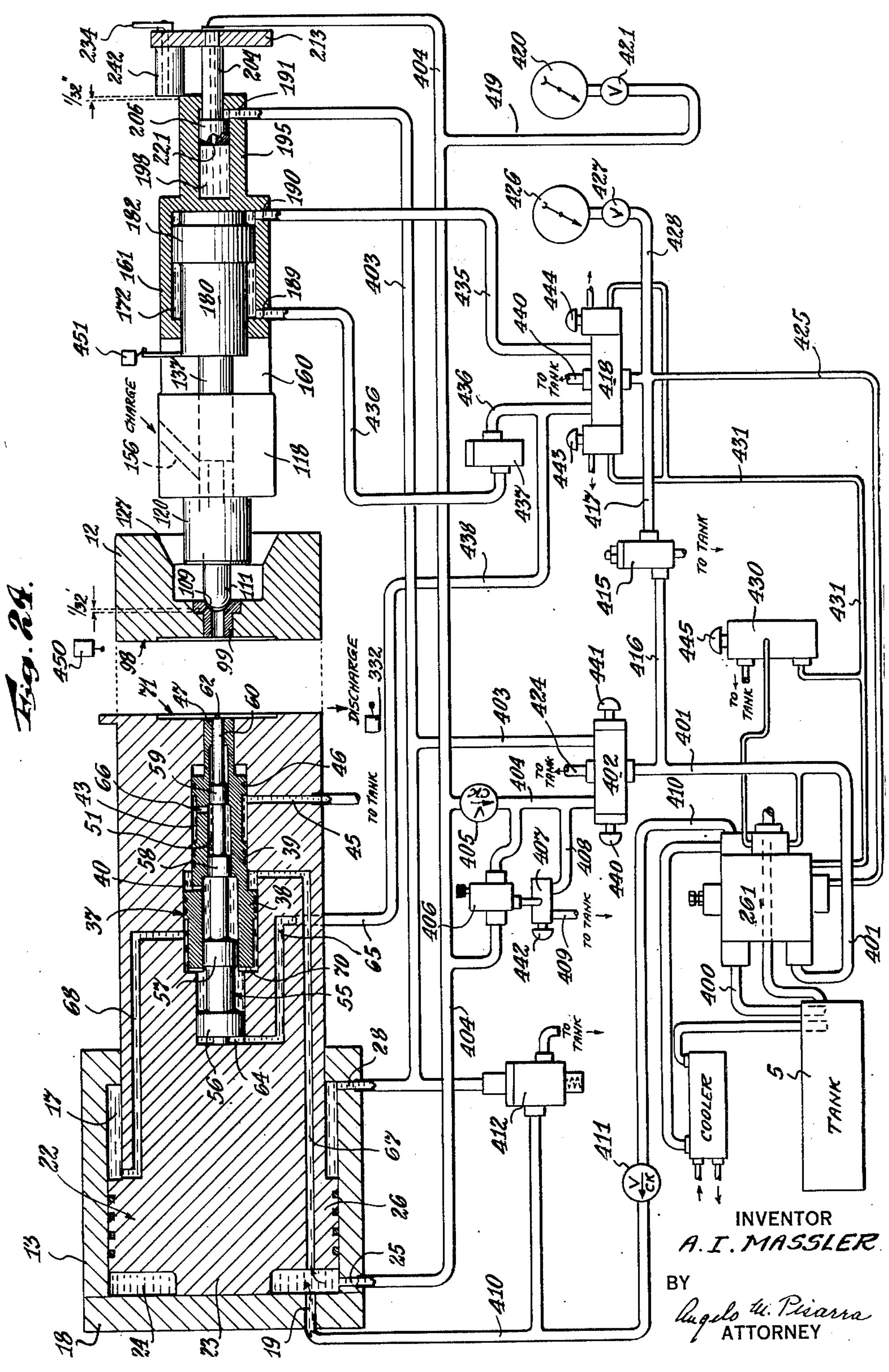
Fig. 24 is a diagrammatic view of the novel mechanism shown partly in section and partly in side elevation, and also the novel hydraulic circuits in novel combination therewith.

As shown diagrammatically in Fig. 24, there is a supply line 400 connecting the supply tank 5 to the high pressure pump of the compound pump 261, which high pressure pump supplies the oil through a high pressure supply line 401 connected thereto and to a conventional four-way solenoid operated valve 402 having two solenoids 440 and 441 and having a return line 424 to tank 5. The stem of a high pressure branch line 403 is connected to valve 402. A branch of line 403 is connected to port 191 and its other branch is connected to port 28. The stem of another high pressure branch line 404 is connected to valve 402. A branch of line 404 is connected to port 25 and its other branch is connected to port 221. A check valve 405 is in the stem of the branch line 404, just prior to the juncture between the stem and branches thereof.

An adjustable relief valve 406 is connected to the stem of the high pressure line 404 at a place between valve 402 and check valve 405 and to the branch thereof connected to the port 25. A normally closed three-way valve 407 having a solenoid 442 is operatively connected to the relief valve 406 and has its inlet side connected to the stem of the line 404 by pipe 408 at a place between the valve 402 and valve 405. A pipe 409 connects the outlet side of valve 407 to the tank 5. A low pressure line 410 having a check valve 411 therein is connected to the low pressure pump of the compound pump 261 and to the port 19. A normally closed two-way hydraulic operated spring return valve 412 is connected to that branch of the high pressure line 403 which goes to the port 28 and is also connected to the low pressure line 410, at a place between the port 19 and the check valve 411 and has a tank return pipe. The high pressure line 401 is connected to a sequence relief valve 415 by line 416. The sequence relief valve 415 in turn is connected by line 417 to a solenoid controlled hydraulically operated four-way valve 418 having solenoids 443 and 444 and having an exhaust line 440 returning to tank 5. A line 419 branches off the line 404 and is connected to a dial pressure gage 420 through a gage stop valve 421. A high pressure line 425 extends from the high pressure pump of the compound pump 261 to the valve 418 and also to the line 417 and to a dial gage 426 by way of a stop valve 427 through a line 428 connected thereto and also to the line 417. A solenoid operated spring return three-way pilot valve for duplex operation 430 having a solenoid 445 is connected to the pilot pressure line 431.

Valve 430 is connected to the control on low pressure pump of the compound pump 261 and has an exhaust connection to tank 5. Line 431 connects the internal gear pump (commonly called pilot pump) to the two pilot valves of the four-way valve 418. A high pressure line 435 connects the valve 418 with the port 190 and a high pressure line 436, having an oil gear foot valve 437 therein, is connected to the valve 418 and the port 189. A line 438 is connected to passageway 65 and to the line 436 at a place between valves 418 and 437. A line connects line 401 to control for low pressure pump.

The pilot pump delivers only a small quantity of oil, about six gallons per minute at about 150 pounds per square inch. Within the pump this acts to keep the high pressure pump at full volume. The line 425 is leading the system pressure back to the pump to so act that when the system pressure reaches the pressure as set at the pressure adjustment on pump, this pressure acts to overcome the pilot pressure and volume delivered by the high pressure pump is reduced accordingly. When the system pressure is reduced by shifting of a valve or otherwise, pilot pressure acts again to push the pump to full volume. When pilot pressure is admitted from line 431 through valve 430 to act in one direction on the control of the low pressure pump, the delivery of the pump goes to line 410. Then when the control is exhausted through valve 430 to tank 5 the flow is diverted to cooler. The opposite end of control is connected through the branch to high pressure line 401 so that when system pressure builds up to equal the low pressure setting at the pump the pressure is admitted to shift the control so as to divert the flow to the cooler. Even when solenoid 445 is energized, the pilot pressure is acting on the control, the system pressure will boss and the low pressure pump will be unloaded to the cooler while the system pressure continues to build up to high pressure settings.

All of these lines, the valves, as well as the timing circuits and mechanisms, not shown, are all conventional and per se are not my invention, and may all be disposed above the top of the tank 5 and are located within the side limits of the tank and tension members 11, plates 210 and the vertical housing 250 to provide an elongated, relatively narrow, compact independent single unit, occupying only a limited amount of space and with a conveyor belt 330 extending transversely through the space between the angularly disposed operating mechanism and the tank, so as to receive records from the machine.

*Operation*

With the parts disposed in their relative positions as shown in Figs. 4 and 5, the die is completely open and the movable die head 71 is located in its maximum retracted position limited by the lower face of the piston ram 22 butting against a face of the cylinder head 18. A step by step complete cycle of operation is as follows:

By manipulating the various controls carried by the column 250, the motor 260 together with pumps 261 are placed in operation and so maintained during the operation of the machine for providing the desired fluid pressure in the various supply lines, which is visibly indicated to the operator by dials 420 and 426 on the board 250. At this stage B, before the automatic cycle is started, all the solenoids are in the de-energized state, with the duplex pump volume being circulated through the cooler and the high pressure pump volume being circulated back to the tank 5 through valve 402 and the volume from the low pressure pump is flowing to the cooler. At the stage B shown in Figure 25 all of the solenoids are in the de-energized state and upon actuation by the operator of the starting button 500 the automatic cycle is started. The solenoids 441 and 445 become energized to condition the valves 402 and 430. The adjusted valves 402 and 430 connect the port 28 to exhaust through the line 403 and at the same time high pressure pump volume passes from the valve 402 through relief valve 406, line 404, port 25 through the lower part of the clamping cylinder 13.

While the oil is thus admitted under pressure into the space 24 of the cylinder 13 from the line 404, oil is also admitted thereto from the low pressure pump through the line 410 and port 19. Pressure is exerted on the lower face of the piston head 26 of the ram 22 by the oil from both the lines 410 and 404, and particularly by that from the line 410 due to the large volume of oil conveyed thereby. This causes the clamping ram 22 together with the parts operatively connected thereto to move up at a fast speed on a centerline coincidental with that of the cylinder 13. At the same time the oil is admitted into the lower part of the cylinder 13, it in part passes through the passageway 67 and into the upper end of the bore 40, and acts upon the piston head 37 to move the stripper 47 from dotted line position shown in Fig. 22 to and maintain it in full line position shown in Fig. 24, because the bore 40 on the other side of piston 37 is on exhaust through the passageway 68, bore 17 and line 403 through the valve 402 and line 424 to the tank 5, and also from bore 40 into the bore 59 to act upon piston 57 to keep the ram rod in retracted position. The clamping ram 22, now traveling at a relatively high speed, actuates limit switch 450 at stage K whereupon timer *Ta* is started, solenoid 445 is de-energized, thereby conditioning valve 430 so that duplex pump volume is by-passed through a by-pass valve in this pump through the cooler to the tank 5, while the high pressure volume continues to move ram 22 forward and solenoid 443 is energized to actuate the control valve 418, thereby connecting line 435 to line 417 and placing line 436 on exhaust through valve 418.

As the oil is being unloaded to the cooler, the slight remaining gap between the die heads is closed by the slow travel of the movable die head 71 effected by only the additional volume of oil supplied to the cylinder 13 through the line 404 resulting in a slow speed kissing of the dies. The oil from the high pressure line 404 continues to feed into the clamping cylinder 13 and at stage C builds up an initial clamping pressure between the dies of about 1500 to 2000 pounds per square inch and is automatically controlled and maintained by the adjustment of the relief valve 406. At stage C and simultaneously with the building up of said pressure between the dies, oil is admitted through the other branch of the high pressure line 404 through the opening 221 into the bore 198 and acting against the top end thereof, forces the cylinder 161 together with the injection cylinder 120 and nozzle head 111 to travel downwardly a slight distance of the order of one thirty-second of an inch along a centerline coincidental with that of the cylinder 13 to firmly seat the spherical end of the nozzle head 111 in the concave seat 109 of the sprue bushing 99 later to prevent leakage of plastic material at this juncture. This is completely effected at stage D and is quickly accomplished in the initial part of the period between stages C and G, in which period the dies are constantly maintained under initial clamping pressure as heretofore described. Thus the clamping ram 22 and the seat of the injection nozzle are placed under the same unit pressure.

As a consequence of setting of valve 406 the oil pressure builds up in line 416 until it reaches a value higher than the initial pressure controlled by valve 406 equal to the setting of valve 415 and then passes through sequence valve 415 through the line 417, valve 418, line 435 to the upper side of the cylinder 161 to advance the plunger 137 in the cylinder 120. At the same time the oil which passes beyond the valve 415 also passes through line 425 to exert a pressure on a control for the high pressure pump to lower the delivery of the pump and to maintain the pressure as set by pressure adjustment on the pump. The fluid under high pressure, passing through valve 415, passes through into the upper end of bore 172, while the lower end of the bore 172 is on exhaust through the port 189, line 436 through valve 437 into the valve 418 and through line 440 connected to the tank 5. As the oil feeds into the upper part of the chamber 172, the pressure built up thereby acts against the upper face of the piston head 182 to move the ram 180 and the injection plunger 137 downwardly in a center line coincidental with that of cylinder 13. In the course of its initial travel the free end of the injection plunger moves from a position as shown in Fig. 5 and near the upper limit of the passageway 156 through the cylinder 120, first slightly compresses the granular fusible plastic material fed solely by gravity from the hopper 155 to completely fill the free space therein with rather loosely compacted material.

The free end of the plunger 137 acts upon the granular material whose angle of rest is approximately that of the angle at which the free lower face of the plunger 137 is disposed to the horizontal so that a complete filling is automatically effected. The plunger 137, in the course of first compacting the loose material, closes off the passageway 156 in the period between stages D (Fig. 18) and M (Fig. 19) and continues downwardly to further compact the material and apply pressure to the portion thereof located in the lower part of the cylinder 120 and which has been softened or its viscosity substantially reduced. This pressure is transmitted thereto, whereby the material of lower viscosity at the lower end of cylinder 120 is forced through the openings in the nozzle 111 and out of the nozzle through the sprue bushing 99 and against the sprue remover 60 whose teat 62 acts as a shallow spreader whereby the material may be evenly fed and fill the space between the dies and continues to move downwardly until it reaches the stage E (Fig. 19) to thereby build up the injection pressure on the injected material, so that a force of about 2000 to 2500 pounds per square inch is exerted thereby on the movable die in a direction opposite to that force exerted by the clamping ram 22. The initial clamping pressure in the period between the stages C to G (Fig. 20) is maintained substantially constant and the pressure in the period between the stages E and F is also maintained substantially constant with the pressure in the period between the stages E to F, being greater than the initial clamping pressure during that same period, so that the pressure per unit of area in the mold bosses in order that a slight spreading action between the die heads may occur.

Figures 19, 20:
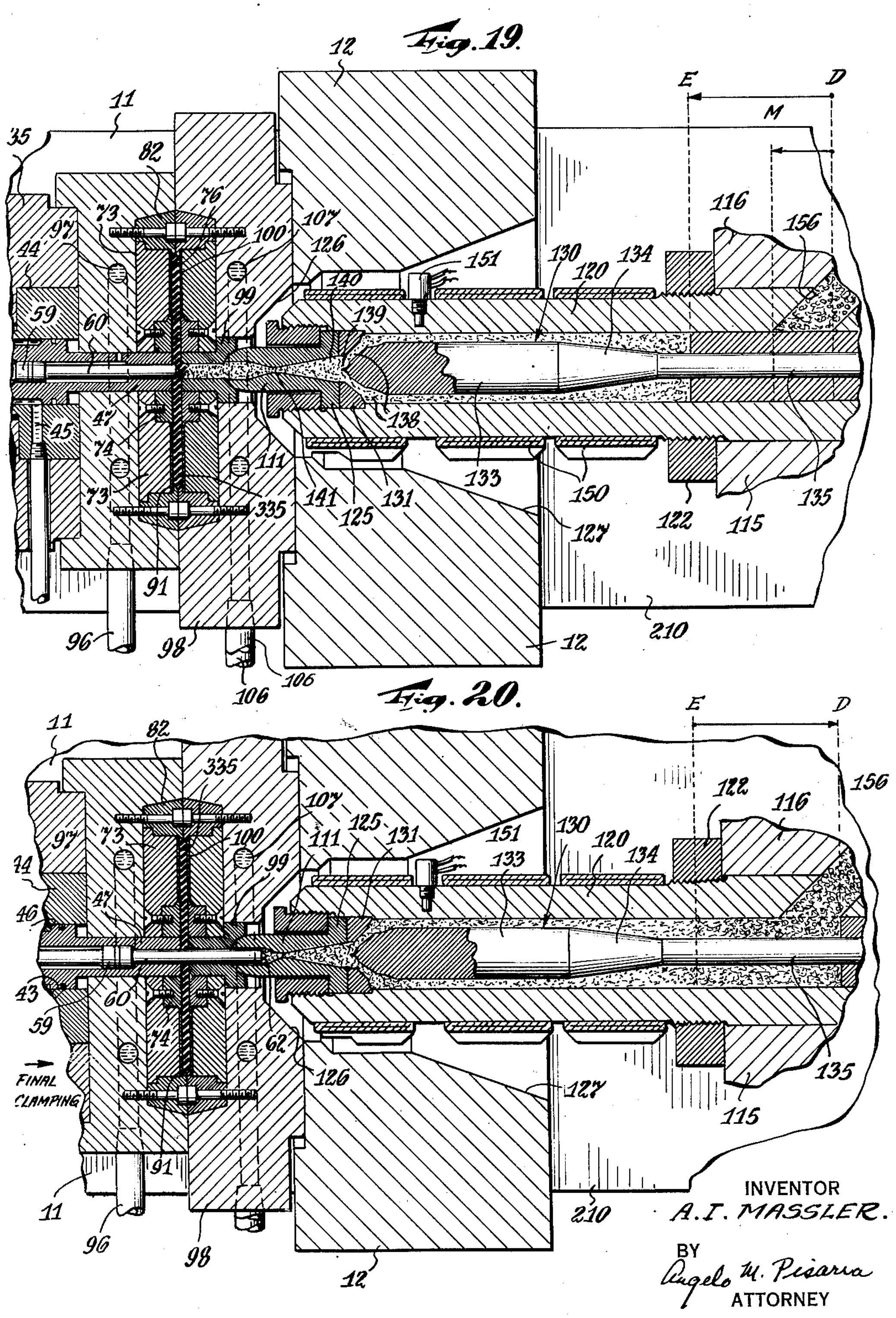
Fig. 19 is a foreshortened view similar to Fig. 18 and shows the relative position of parts at the end of the injection of the plastic material into the closed dies.
Fig. 20 is a view similar to Fig. 19 and shows the relative position of parts when the sprue remover has accomplished its functions.
Figure 25:
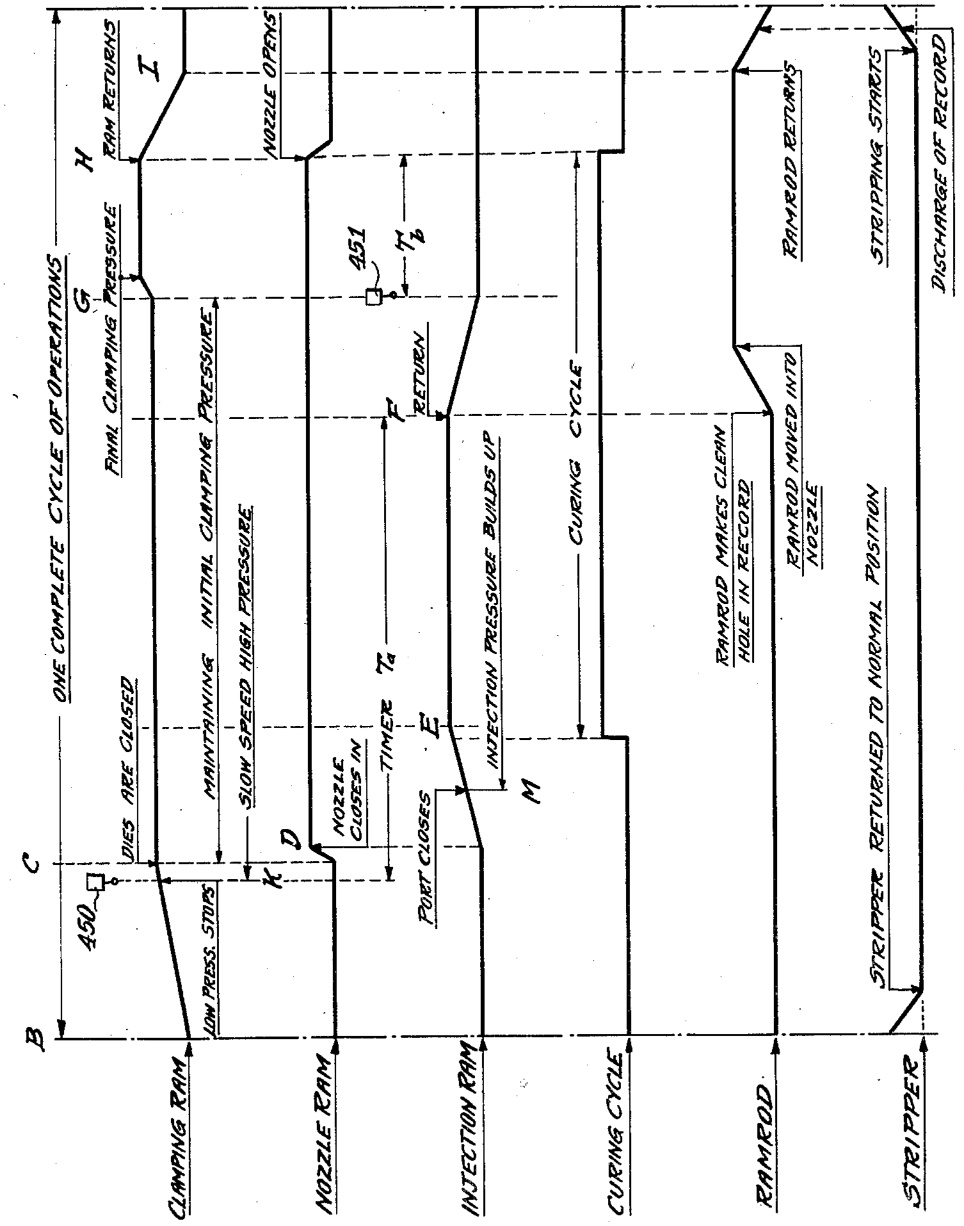
Fig. 25 is a schematic view showing the various operations and the time relation of operations during a complete cycle of operation.

The pressure of the plunger 137 is controlled by the control of the high pressure pump automatically reducing its volume when a pre-set pressure is reached in the injection cylinder. Due to the water circulation in the die heads and because the newly formed record 8 sets quicker than the sprue, which is thicker in cross section and therefore not completely set, the sprue remains softer than the record. The setting cycle, which is also indicated in Fig. 25, initially starts at about the stage E, the time the maximum injection pressure is reached, and continues in the period between the stages E and F. After a period of time which is suited to various conditions involved, such period being controlled by the electric timer *Ta*, timer *Ta* times out and resets, whereupon solenoid 443 is de-energized and solenoid 444 is energized. The valve 418 is shifted so as to direct the oil under pressure through line 436 over foot valve 437 through passageway 189 to the lower part of chamber 172 to return the piston 182 upward and at the same time the upper part of the chamber is on exhaust through the line 435 through the valve 418 to tank 5. Simultaneously the oil under pressure is admitted through branch 438 to passageway 65, chamber 64 and acts upon the lower face of the ram rod 55 causing it to move upward as indicated in Figure 20 between the stages F and G, whereby the sprue remover 60 punches a clean hole 9 through record 8 and pushes the sprue up through bushing 99 and in the discharge end of the nozzle 111 and mostly beyond its restricted orifice 141. It further serves to provide a seal to maintain the pressure within the die.

Then as the piston 182 reaches the end of its retraction stroke, it strikes a limit switch 451 whereupon electric timer Tb is started and solenoid 442 is energized controlling the valve 407, so that the oil under high pressure through line 408 passes through valve 407 to by-pass the controlled mechanism of valve 406 to the passageway 404 to the cylinder 13 to build up a final clamping pressure of approximately 2750 to 3000 pounds per square inch of the dies as indicated at stage G. Retraction of piston head 182 retracts the injection plunger 137 upwardly beyond the passageway 156 to move to its former position, whereupon a new charge of granular material automatically discharges through the passageway 156 on top of the heated charge in the lower part of the cylinder 120 to substantially completely fill the void between the spreader and the cylinder. It was found that in the cooling of the record a slight contraction occurs, and it was because of this that a slight spreading action was allowed in the forming of the record; so at this point increased clamping pressure can follow up the contraction to impart to the record sharp impression from the matrices for the remainder of the curing period controlled by an electric timer *Tb*. This increased clamping pressure reaches a maximum and is maintained for a controlled period of time in the period shown between stages G and H.

The the timer *Tb* clocks out at stage H solenoids 440 and 444 are de-energized and solenoid 441 is energized, whereby the valve 402 is actuated, whereupon a branch of the line 404 connected to port 25 is connected to valve 402 through line 424 to the tank 5 and high pressure fluid through pipe 403 feeds through port 28 through the upper end of the bore 17 driving the ram 22 rearwardly until it reaches the position shown in Fig. 24, and being in its maximum contracted position. As the fluid is admitted through the line 403 to the upper end of cylinder 13, the pressure built up thereby acts against the piston 26 and simultaneously acts against the valve 412 to open it, whereupon the fluid from the lower part of the cylinder 13 also exhausts through line 410 and valve 412 to the tank.

In the course of retraction of the ram 22 the high pressure fluid is admitted from line 403 through port 191 to the upper end of bore 198 to drive the injection unit upwardly only a slight distance, which movement is controlled by the stop cams 242 and 243 located in operative position. This slight movement of the injection unit unseats the spherical end of the nozzle a distance of one thirty-second of an inch from the seat of the sprue bushing 99 and remains in this condition until the stage B of the new cycle is reached.

When the ram 22 attains its maximum retracted position at stage I (Fig. 21) the pressure builds up in the fluid in the upper part of bore 17 and is transmitted through the passageway 68 to the lower part of the bore 40 and acts against the lower face of the piston head 37 to drive the compound piston and record stripper 47 upwardly while the upper part of the bore 40 is on exhaust through the passageway 67. Simultaneously, the liquid under pressure which flows into the lower part of the bore 40 flows through grooves in the lower part of the compound piston to the upper part of the bore 61, while the lower part of the bore 61 is on exhaust through line 438 and valve 418, to return the ram rod 60 to its maximum retracted position. At the same time the stripper is being driven upwardly against the center of the record which is held to matrix 76 by the short inwardly extending flange 90 or the shoulder 91. The outward movement of the stripper 47 strips the record (Fig. 22) off of the movable die head and then the record drops downwardly into the receiving end of the chute guide. The record reaching the chute will roll down the chute gradually tilting until it leaves the chute in a flat position and there deposits on and is carried by the conveyor belt 330. While traveling towards the chute the record strikes and actuates a microswitch 332 which starts the next cycle at stage B. In its progress on the conveyor, the still warm record is weighted to maintain its flatness characteristic.

While the invention has been described in detail, it is not to be limited to the exact construction shown, because it is susceptible to various changes and modifications within the scope thereof.

I claim:

1. An injection molding machine comprising fixed and movable chilled dies defining, when closed, a mold cavity, a sprue bushing opening through opposed surfaces of said fixed die, said bushing having a longitudinally continuous one-diameter bore, one end of said bore opening into said cavity, an injection cylinder having a nozzle end engaging the other end of said sprue bushing, an elongated rod having the diameter of said bore and movably supported with respect to said movable die co-axially of said bushing bore, said rod being movable from a retracted position clear of said cavity to a position extending across said cavity, through the entirety of said bushing and into said nozzle, means to pressure inject heated thermoplastic material from said cylinder through said bushing bore into said cavity in the retracted position of said rod to form a molded product having an integral sprue within said bushing bore, and means to then move said rod from the retracted position to said extended position to sever the sprue from said product and to return the sprue to the nozzle end of said injection cylinder.

2. An injection molding machine comprising cooled, fixed and movable dies defining, when closed, a mold cavity, a sprue bushing opening through opposed surfaces of said fixed die and having a common diameter bore extending the major portion of its length and opening into said cavity, an injection cylinder having a nozzle fixed to one end thereof, said injection cylinder being reciprocably movable to retractably engage said nozzle with said sprue bushing, an elongated rod having a diameter common with the diameter of said bushing bore, said rod being movable with respect to said movable die co-axially of said bushing bore from a retracted position, extending slightly into said cavity, to a position extending across said cavity through the entirety of said bushing bore and into said nozzle when the dies are closed and said nozzle is engaged by said bushing, means operable upon engagement of said nozzle with said bushing to inject heated thermoplastic material from said cylinder through said bushing bore and into said cavity to form a solidified molded product having an integral sprue within said cavity and bushing bore, and means to then advance said rod from said retracted position to said extending position prior to disengagement of said nozzle from said bushing, whereby the sprue, within said cavity and bushing bore, is severed from the product and returned to the nozzle end of said injection cylinder for reheating.

3. In an injection molding machine of the character described, a pair of relatively movable chilled dies having, between abutting surfaces thereof, a mold cavity, means defining a heated zone into which thermoplastic material is delivered to convert the material to moldable state, a sprue bushing between said means and cavity, said bushing having a common diameter bore opening into said cavity, means for pressure injecting heated material from the heated zone defining means through said bushing into the mold cavity of the chilled dies to form a solidified molded product in said cavity, including a sprue portion extending beyond the limits of said mold cavity into said bushing bore, an elongated rod having a diameter common with the diameter of said bushing bore, means to actuate said rod through said bushing to sever the sprue portion from the product and to deliver the entire sprue portion to the means defining the heated zone for reconversion to moldable state, and means for removing the molded product from the mold cavity of one of the dies, when the dies are separated in delivering the molded product from the machine.

4. In an injection molding machine of the character described, a pair of relatively movable chilled dies having, between abutting surfaces thereof, a mold cavity, means defining a heated zone into which thermoplastic material is delivered to convert the material to moldable state, a sprue bushing between said means and cavity, said bushing having a common diameter bore opening into said cavity, means for pressure injecting heated material from the heated zone defining means through said bushing into the mold cavity of the chilled dies to form a solidified disc-like molded product in said cavity, including a sprue portion extending from the central portion of the product beyond the limits of said mold cavity into said bushing bore, an elongated rod having a diameter common with the diameter of said bushing bore, means to actuate said rod through the mold cavity and bushing bore to form an aperture in the central portion of said product and to sever the sprue portion from the product and deliver the entire sprue portion to the means defining the heated zone for reconverting the same to moldable state, means to then retract said last named means from the mold cavity, means to open the dies, and means to then remove the apertured disc-like product from the mold cavity of one of the dies in delivering said product from the machine.

5. In injection molding machines, a pair of cooled relatively movable die heads, axially alined sleeves in said heads, said sleeves having alined common diameter elongated bores, means including said sleeves forming, on adjacent surfaces of said heads when in abutting engagement, a mold cavity, means forming a heated zone adjacent and spaced from one head, the sleeve of said one head opening through opposed surfaces of said head, said heated zone forming means having a discharge nozzle abutting one end of the sleeve of said first named head, the other end of said sleeve opening into the mold cavity, means for delivering thermoplastic material to said heated zone, means for pressure injecting heated thermoplastic material from said heated zone into the mold cavity through said nozzle and the bore of the sleeve of said first named head in forming a solidified product including an integral sprue, a rod movable in the sleeve of the other head, said rod having a diameter common with the diameter of the bore of the first named sleeve, and means for operating said rod from a position clear of the mold cavity across the cavity through the bore of the first named sleeve to a position within said discharge nozzle in severing the solidified sprue from the product and returning said sprue to the heated zone for reheating.

6. The method of producing a molded thermoplastic product and trimming the product while held within the dies for forming said product, which comprises pressure injecting heated thermoplastic material from a heated zone into a cavity of a pair of relatively movable cooled dies, partially forming the mold cavity by a pin exposed to said cavity, forming a solidified product including an integral sprue of the material injected into said cooled dies, then moving said pin across the cavity to trim the sprue from said product, while supporting the product in said closed dies and deliver the entire sprue to said heated zone for reheating, then returning the pin to position clearing said cavity, then opening the dies, and then removing the product from one of said dies.

ABRAHAM I. MASSLER.

REFERENCES CITED

The following references are of record in the file of this patent:

UNITED STATES PATENTS

| Number | Name | Date |
|---|---|---|
| 1,208,090 | Burroughs | Dec. 12, 1916 |
| 1,215,784 | Enley | Feb. 13, 1917 |
| 1,724,332 | Will et al. | Aug. 13, 1929 |
| 1,939,960 | During | Dec. 19, 1933 |
| 2,033,735 | Pack | Mar. 10, 1936 |
| 2,107,190 | Shaw | Feb. 1, 1938 |
| 2,111,857 | Jeffery | Mar. 22, 1938 |
| 2,297,596 | Westin | Sept. 29, 1942 |
| 2,372,177 | Conner | Mar. 27, 1945 |
| 2,420,405 | Alves | May 13, 1947 |
| 2,431,414 | Morin | Nov. 25, 1947 |
| 2,438,856 | Knowles | Mar. 30, 1948 |
| 2,465,204 | Dalton | Mar. 22, 1949 |
| 2,471,148 | Gale et al. | May 24, 1949 |
| 2,490,625 | Hall | Dec. 6, 1949 |

FOREIGN PATENTS

| Number | Country | Date |
|---|---|---|
| 23,732 | Great Britain | Dec. 8, 1914 |